United States Patent [19]

Cope

[11] Patent Number: 5,508,103
[45] Date of Patent: Apr. 16, 1996

[54] EXTRUSION PRODUCT WITH DECORATIVE ENHANCEMENT AND PROCESS OF MAKING THE SAME

[75] Inventor: Carroll W. Cope, Marion, Va.

[73] Assignee: Marley Mouldings Inc., Marion, Va.

[21] Appl. No.: 377,175

[22] Filed: Jan. 30, 1995

[51] Int. Cl.⁶ ............................................. B32B 9/00
[52] U.S. Cl. ............... 428/318.8; 428/77; 428/122; 428/158; 428/182; 428/192; 428/217; 428/318.6; 428/409; 428/458; 428/462; 264/177.1; 264/321; 156/244.12; 427/256
[58] Field of Search ............................ 428/122, 318.6, 428/319.7, 217, 409, 318.8; 264/321, 171.1, 129, 131, 163, 167, 46.1; 427/256, 358, 356; 156/244.12, 78

[56] References Cited

U.S. PATENT DOCUMENTS

| | | | |
|---|---|---|---|
| 3,431,164 | 3/1969 | Gilbert | 161/161 |
| 3,764,642 | 10/1973 | Boutillier | 264/47 |
| 4,600,461 | 7/1986 | Guy | 156/244.12 |
| 5,311,814 | 5/1994 | Kierson | 101/6 |
| 5,326,592 | 7/1994 | Goewey et al. | 427/256 |
| 5,415,822 | 5/1995 | Cook | 264/171 |

FOREIGN PATENT DOCUMENTS 2276318  9/1994  United Kingdom.

*Primary Examiner*—Patrick J. Ryan
*Assistant Examiner*—Abraham Bahta
*Attorney, Agent, or Firm*—Willian Brinks Hofer; Hugh A. Abrams

[57] ABSTRACT

The present invention provides a process for forming by extrusion a profile of extrudable material having a hard skin surface on a portion of the profile and a decorative enhancement on another portion of the profile. The decorative enhancement is formed integrally with the profile by use of an embossment technique on the profile before the extrusion material sets and hardens. The profile may be used in applications such as picture frames as well as door, wall and window moldings.

23 Claims, 3 Drawing Sheets

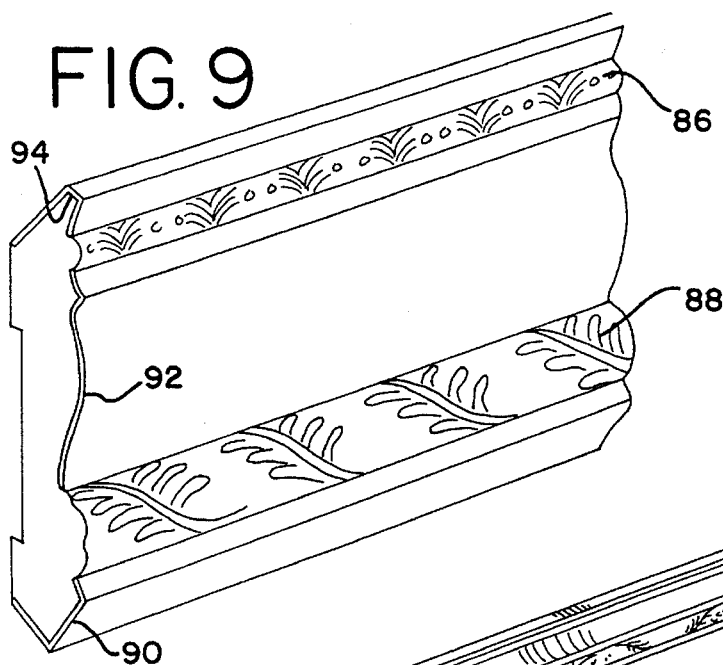
FIG. 9
FIG. 8
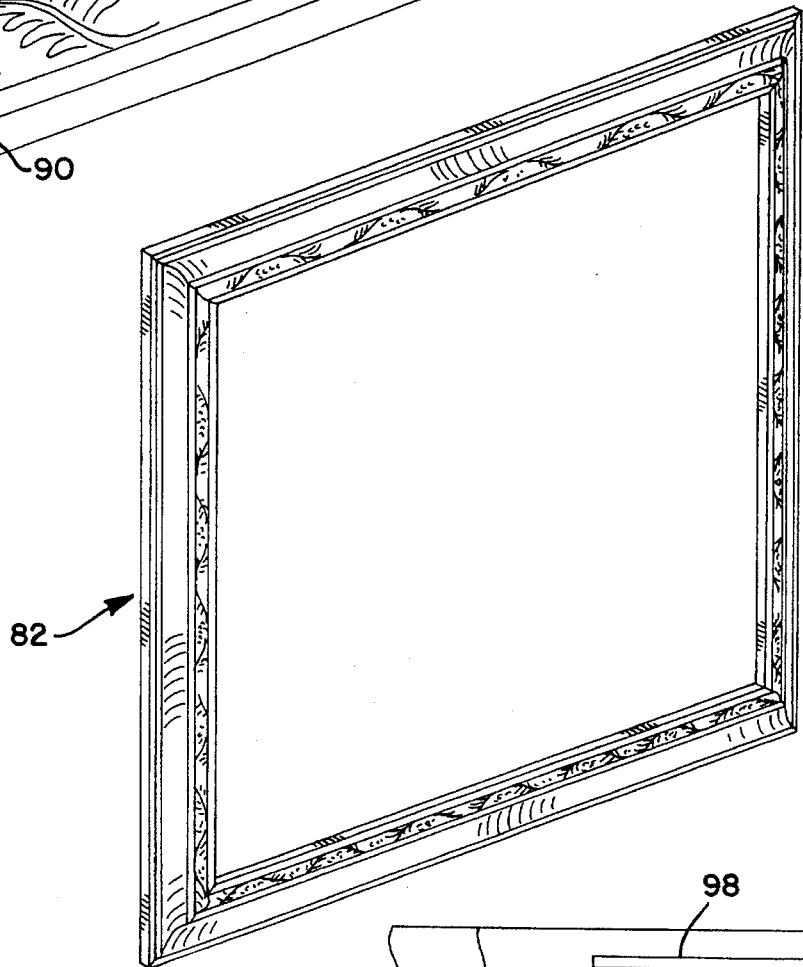
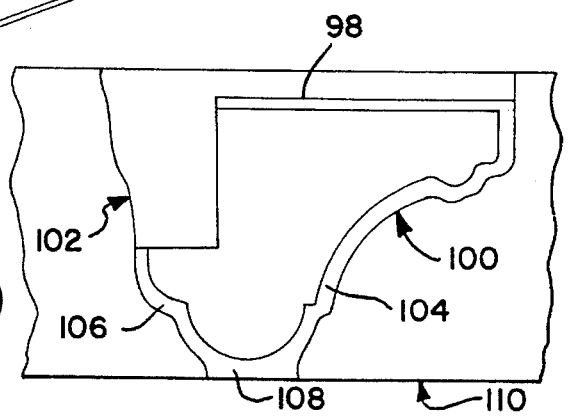
FIG. 10

EXTRUSION PRODUCT WITH DECORATIVE ENHANCEMENT AND PROCESS OF MAKING THE SAME

BACKGROUND OF THE INVENTION

The present invention relates generally to extrusion products and processes. The invention has particular application to a method of forming an ornamental enhancement integral with an extrusion profile. The resulting product has applications in the molding industry, including picture frames and door, wall and window moldings.

As a result of the increasing cost of wood and the attendant cost of detailing wood pieces for building construction, there exists a demand for alternatives to solid wood construction products. Accordingly, the use of plastic extrusion profiles as substitutes for wood products in the areas of picture frames and door, wall, and window moldings has increased significantly in recent years. Plastic extrusion processes of materials such as polyvinyl chloride (PVC) and polystyrene, for example, can provide a substitute for a wood picture frame or door or window molding.

While such plastic extrusions can provide a substitute for a wood product, the plastic extrusion may also need to be decorated with ornamental features to enhance the beauty and desirability of the ultimate product. Various types of designs and patterns, as well as paints and stains of various colors, are used to cover and otherwise decorate the plastic extrusion profile.

A conventional method for forming an ornamental feature on a plastic picture frame or molding is shown in UK Patent Application GB 2,276,318A to Robobond Ltd. of Great Britain. In the Robobond process, plastic frame members are extruded and cut into appropriate lengths. After the plastic extrusion cures and hardens, a solvent based wood paste is applied to the frame surface in such a manner that it forms an ornamentation on the surface of the length of plastic. The paste is then allowed to dry and the picture frame is assembled from the extrusion portions.

The Robobond patent teaches a preferred solvent based wood paste of toluene and acetone. The wood paste is etched into the plastic extrusion profile and enables the paste to form a resin bond with the polymer of the plastics material.

Several disadvantages exist with the Robobond process that make it undesirable for large-scale manufacturing. For example, the process requires a period of several days for the wood paste to dry, which is in addition to the time required for the extrusion profile to harden before application of the wood paste. Moreover, during the drying process, the wood paste causes a tension to be applied to the extrusion profile which results in upward bowing of the profile length. In order to counteract the bowing effect, the frames must be held in large drying racks. Finally, the wood paste is not easily applied and substantial amounts are wasted in the excess that is applied to the extrusion profile.

Such disadvantages in terms of time and excess equipment are very significant drawbacks in the effort to provide a low cost picture frame or other construction molding. The present invention attempts to overcome the above-described time and cost disadvantages in conventional ornamentation processes, such as the Robobond process.

SUMMARY OF THE INVENTION

The present invention provides a process for forming a profile of extrudable foam material having a hard skin surface on a portion of the profile and a decorative enhancement on another portion of the profile, which has less hardness or less density than the portion with the hard skin. The decorative enhancement is formed integrally with the profile by use of an embossment technique on the profile before the extrusion material sets and hardens. The process involves an improvement in the use of the so-called Celuka process set forth in U.S. Pat. No. 3,764,642, which is incorporated herein by reference.

The process of the present invention utilizes an extruder in conjunction with a vacuum tank or shaper. A portion of the internal solid surface of the vacuum tank or shaper is cooled to a temperature below the softening point of the extrusion material. The extrusion material is then extruded through the die outlet in the extruder and into the shaper or vacuum tank. When the material contacts the internal surface of the shaper or vacuum tank, the portion of the extrusion profile that contacts the cooled portion of the shaper surface is then cooled rapidly. A thick skin of higher density material is formed on the profile surface. In this manner, a hardened skin is formed on a portion of the extrusion. profile. The remaining portion is of less hardness or less density than the hard skin portion after it has cured and hardened, i.e., the remaining portion does not contain a hard skin.

After the extrusion profile leaves the shaper or vacuum tank, a heated embossing wheel is driven over a portion of the profile that was not hardened by the above-described cooling process. The heat retained in the extrusion profile, as well as the heat in the embossing wheel, allows the formation of a decorative pattern in the non-hardened portion of the profile. The embossing wheel pushes away certain portions of the material and thereby provides an imprint in the form of a desired decorative pattern. The decorative pattern is therefore integral with the extrusion profile and allowed to cure and harden along with the remainder of the profile.

The process of the present invention provides an extrusion profile with an ornamental enhancement in a portion of the profile. After the profile cures and hardens, the profile may be further decorated with hot stamps, stains and paints. The profile may then be utilized in such applications as picture frames or door or window moldings.

Any extrudable material may be used with the present process. The preferred materials include polyvinyl chloride and polystyrene. Additional extrudable materials such as acrylonitrile-butadiene-styrene (ABS) or similar materials may also be used.

The present invention overcomes some of the disadvantages of the conventional ornamentation processes. The ornamentation of the present invention is an integral part of the extrusion profile. The ornamentation process is conducted before the extrusion profile has cured and hardened, which avoids the lengthy delays encountered in prior processes. Moreover, the ornamentation dries along with the extrusion profile, which eliminates the several days for drying required in conventional processes that add wood paste ornamentation to hardened extrusion profiles. Other advantages of the present invention will be apparent from a review of the description of the preferred embodiments.

BRIEF DESCRIPTION OF THE DRAWINGS

For a more complete understanding of the invention, one should refer to the embodiments illustrated in greater detail in the accompanying drawings and described below by way of examples of the invention. In the drawings, which are not to scale:

FIG. 8 is a perspective view of a frame constructed with the extruded profile of the present invention;

FIG. 9 is a perspective view of a wall molding constructed with the extruded profile of the present invention;

FIG. 10 is a cross-sectional view of a die and shaper, illustrating the die for use in the present invention;

FIG. 11 is a schematic illustration of the pivoted embossing wheel and support wheel with the extrusion profile between the two wheels.

DETAILED DESCRIPTION OF THE PREFERRED EMBODIMENTS

Figure 1:
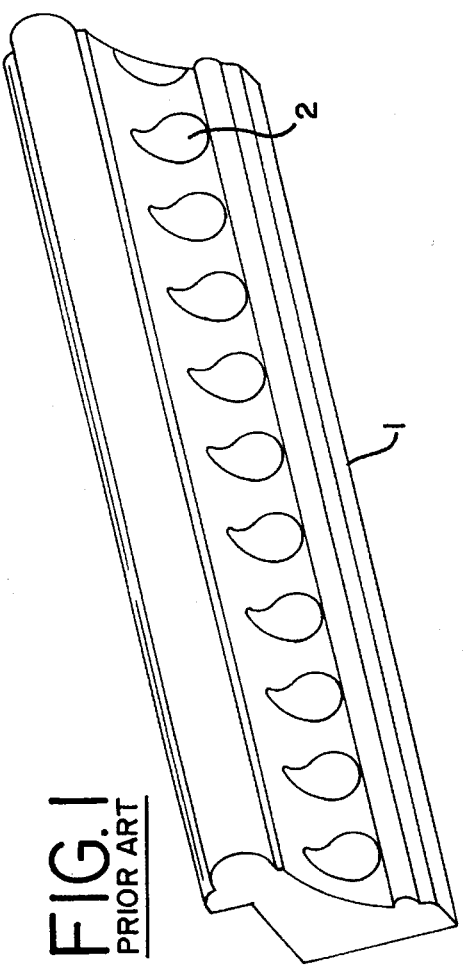
FIG. 1 is perspective view of a frame member of the prior art.

Turning now to the drawings, FIG. 1 shows a frame member 1 of prior art U.K. Patent Application GB 2,276, 318A. The frame member 1 has ornamentation 2 formed on the upper surface by the application of wood paste to the plastic extrusion after completion of the extrusion process. After the plastic extrusion has cured and hardened, the ornamentation is added to the top of the frame 1 and the solvent of the wood paste etches into the plastic material and forms a resin bond with the polymer of the plastic material.

As noted above, this prior art process involves extensive amounts of time for hardening of the extrusion profile before application of the wood paste, and then additional time for drying of the wood paste. Additionally, the frame must be held tightly during drying to prevent bowing of the frame from the wood paste.

Figure 2:
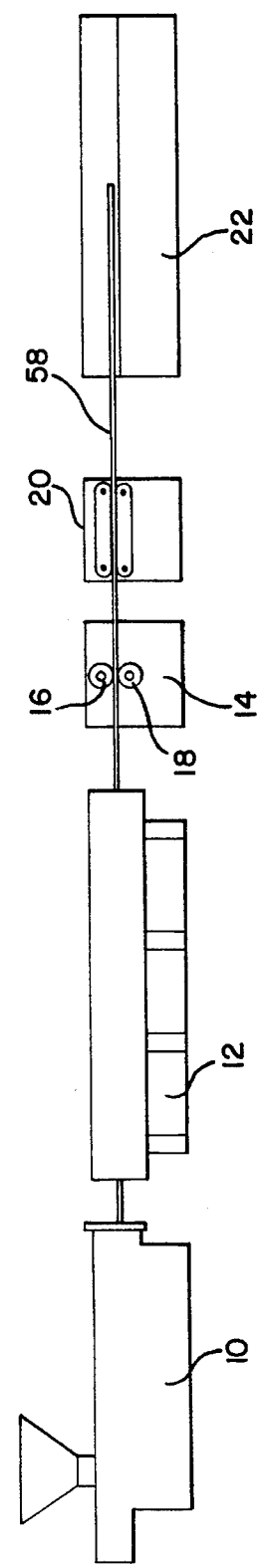
FIG. 2 is a schematic diagram showing the sequence of operations in the process of the present invention with polyvinyl chloride extrusion material.
Figure 3:
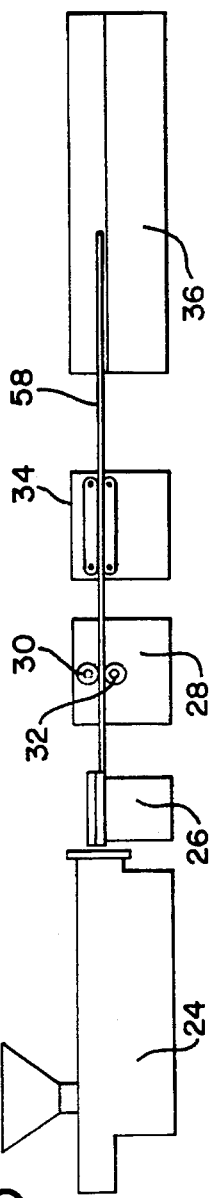
FIG. 3 is a schematic diagram showing the sequence of operations in the process of the present invention with polystyrene extrusion material.

Schematic diagrams that illustrate two preferred sequences of preparation of the extrusion profile of the present invention are shown in FIGS. 2 and 3. In FIG. 2, an extruder 10 is used in conjunction with a vacuum tank 12. Following the vacuum tank is an embossing station 14, which includes an embossing wheel 16 and a support wheel 18. A puller 20 acts to pull the extruded profile from the embossing station 14 and onto a cut-off table 22. The process sequence shown in FIG. 2 is used with polyvinyl chloride (PVC) extrusion material.

A second sequence of preparation is shown in FIG. 3. In this sequence, the extruder 24 is followed by a shaper 26. After the shaper is the embossing station 28, which includes an embossing wheel 30 and support wheel 32, and then a puller 34 and cut-off table 36. The process sequence shown in FIG. 3 is used with polystyrene extrusion material.

The profiles of the present invention may include any extrudable material, but preferably utilize either polyvinyl chloride or polystyrene. The profile material is typically utilized in a picture frame or door, window, wall or other molding, and thus preferably includes component materials that provide high strength and durability. In addition to the above-mentioned materials, the profiles may be formed from synthetic materials that contain PVC or CPVC resins with minor amounts of additives, such as process aids, process modifiers, solid fillers and lubricants for the extrusion process, arid curing compounds. Process aids and modifiers are additives that adjust the extrudability properties and the physical properties of the extruded product.

The materials are formed into an extrudable mixture by combining all of the various ingredients with a high intensity mixer at the appropriate temperature. Resins, fillers and modifiers may be added to the mixture. The extrusion mixture is then utilized in the process of the present invention.

Figure 4:
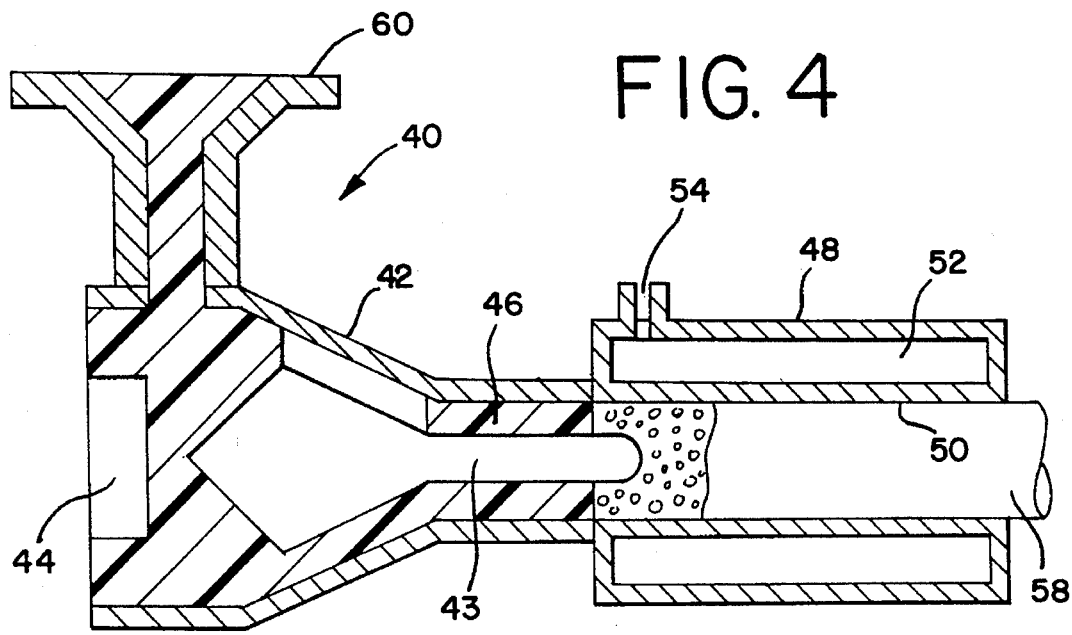
FIG. 4 is a longitudinal sectional view of the end of an extrusion machine with a die and a shaper.
Figure 5:
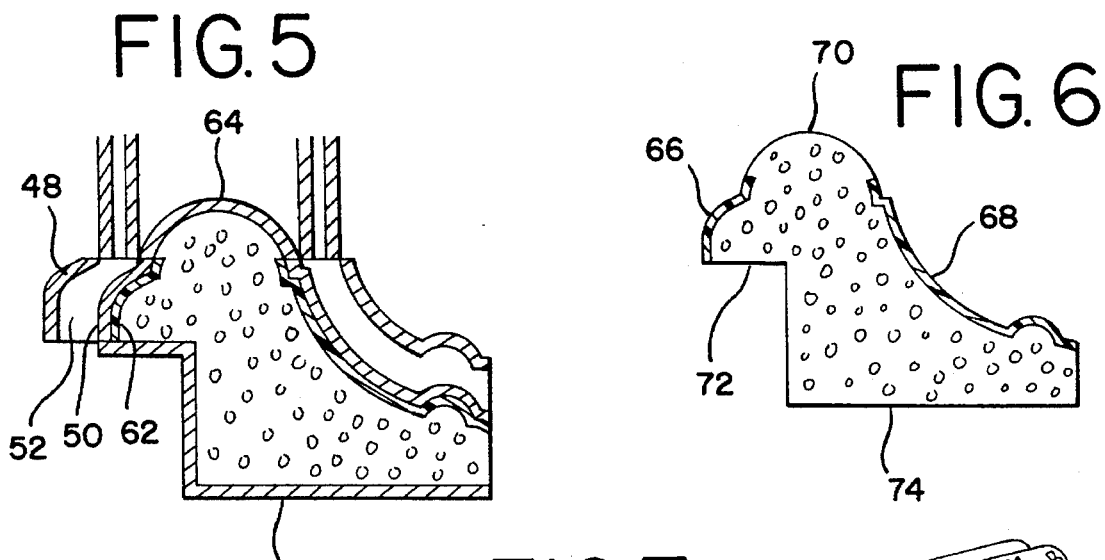
FIG. 5 is a cross-sectional view of a portion of the shaper of FIG. 4, illustrating the cross-section of the profile.

The equipment of FIG. 2 is shown in more detail in FIGS. 4 and 5. The present invention utilizes an improvement in the process of U.S. Pat. No. 3,764,642, which is incorporated herein by reference. An extruder 40 with a body 42, extrusion worm 44 and die 46 is shown in FIG. 4. The die shown in FIG. 2 has a circular section. The die for use with one preferred embodiment of the present invention is shown in more detail in FIG. 10. The shaper 48 includes a cylindrical sleeve 50 with a smooth guide wall. The shaper has substantially the same cross-sectional shape as the die. The shaper includes a heat controlling jacket 52 with connection 54 to enable a temperature regulating fluid to be contained within the jacket 52.

The puller, shown in FIG. 2, acts to draw the extruded profile 58 from the shaper. The composition of extrudable material is prepared and introduced into the extrusion machine through channel 60. The material is pushed through the die, where it only slightly expands, and then begins to fully expand as it enters the shaper 48. The jacket 52 of the shaper 48 is kept at a temperature lower than the softening point of the extrusion material. As the material contacts the inside wall 50 of the shaper, a hard layer is formed on the profile at the points where the profile contacts the cooler inside wall. The process for obtaining a hard surface or skin on the profile, which is described more completely in U.S. Pat. No. 3,764,642, is known as the Celuka process. The hard skin layer may be of variant thickness depending on the conditions in the shaper.

As shown in FIG. 5, the shaper of the present invention has the cooling jacket contact the profile at only certain specific portions of the profile. Thus, the hard skin or layer 62 is formed on only a portion of the profile surface. It is contemplated in the present invention that at least a portion of the profile, shown as portion 64 in FIG. 5, is not provided with the hard skin covering. That portion has material of less hardness or less density, and does not have the skin covering.

In this manner, a hard skin covering is formed on a portion of the extrusion profile, while the extrusion material fills the remainder of the profile cross section. By regulating the speed of the puller, the hard skin is formed on the surface of the portions of the profile and the remainder of the profile is filled with extrusion material and advances into the embossing station. The profile achieves a cross-section that is the same as the cross-section of the outlet of the shaper. The temperatures of the regulating jacket of the shaper and the temperature of the extrusion material, along with the speed of the extrusion profile, are parameters that affect the properties of the resulting product.

Figure 6:
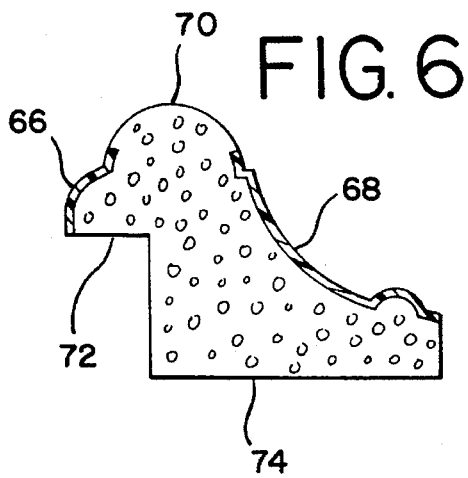
FIG. 6 is a cross-sectional view of the profile that emerges from the shaper of FIG. 4.

The cross-section of the extrusion profile of one embodiment of the present invention is shown in FIG. 6. The hard skin 66, 68 is shown at two locations on the profile. At least a portion of the profile, shown as the upper portion 70 in FIG. 6, must remain without the hard skin in order that the embossing station may place an ornamental feature at that location, as explained more fully below. The remaining portions 72, 74 of the profile may include the hard skin or be left without the hard skin, as desired.

A cross-sectional view of a die and shaper for extruding one embodiment of the present invention is shown in FIG. 10. The die 98 has sides that are slightly less open than the channels 100, 102 of the shaper. The channels 100, 102, or internal solid surfaces, of the shaper are surrounded by a temperature regulating fluid. Thus, channels 100, 102 are cooled to a temperature below the softening point of the extrudable foam material. As the foam material enters the shaper, portions 104 and 106 will be cooled to form a hardened skin. In contrast, portion 108 will contact the bottom 110 of the shaper and not form a hard skin. The shaper opening is slightly larger in the area where the softer (non-hardened) skin is desired. The slightly larger opening allows the molten plastic to travel further before coming into contact with a shaper surface. In this manner, portion 108 will remain non-hardened to allow imprinting of a decorative enhancement by an embossing wheel before the material solidifies into a solid, elongated member.

While one example profile is shown in FIG. 6, many other profiles are contemplated within the scope of the present invention. An example of a wall molding profile is shown in FIG. 9. Additional profiles are possible that provide a decorative enhancement integral with the extrusion profile.

In the embodiment that utilizes polyvinyl chloride as the extrusion material, the shaper is replaced with a vacuum tank 12, as illustrated in FIG. 2. The vacuum tank provides a cooling of the extrusion with the hard skin being placed on particular portions of the profile by contact with a cooling jacket, similar to the above-described jacket in the shaper. The vacuum tank provides a reduced pressure in the inside of the cavity being filled by extrusion material in order to facilitate expansion of the extrusion material and filling of the cavity. The mandrel 43 in FIG. 2 produces a cavity in the extruded material that is filled as the extrusion material expands. As with the shaper, the profile is pulled through the vacuum tank at an appropriate speed in order to provide sufficient cooling of the overall profile to prevent stretching of the profile and so that the appropriate profile cross-section is maintained.

After exiting the shaper or vacuum tank, the profile passes through the embossing station. In the embossing station, a heated embossing wheel places an ornamental decoration onto one or more portions of the extrusion profile that do not have the hardened skin surface. More than one embossing wheel may be used to provide ornamentations at various locations on the profile. The embossing wheel, which is heated from 200° F. to 450° F., provides enough heat in conjunction with the heat retained in the profile to make an indentation in the profile. The embossing wheel provides a negative imprint. That is, the portions of the profile that are outside the decorative pattern are pushed away from the embossing wheel and the decorative pattern stands out from the profile. In this manner, a decorative ornamentation is made integral with the profile and as part of the extrusion profile. The support wheel supports the various angles of the profile during the embossing phase to insure that the profile is not distorted.

As shown schematically in FIG. 11, the emboss wheel 17 and support wheel 19 can be moved vertically or horizontally or rotated to various angles. As shown in FIG. 11, the emboss wheel 17 may be the lower of the two wheels and place the decorative enhancement on the profile from the lower position.

The extrusion profile then leaves the embossing station and is pulled onto the cut-off table. At this point the extrusion is allowed to sufficiently harden so that the profile may be cut into appropriate lengths. As a result of this process, the ornamentation is an integral part of the profile and will harden along with the profile, and not as part of a separate operation.

After the profile is cured and hardened, various finishes may be applied to the profile to enhance and highlight the embossed areas. For example, the embossed and non-embossed areas may be painted, stained, glazed, brushed or clear coated. Additionally, hot foil stamping may be applied to the profile for further decorative effect.

Figure 7:
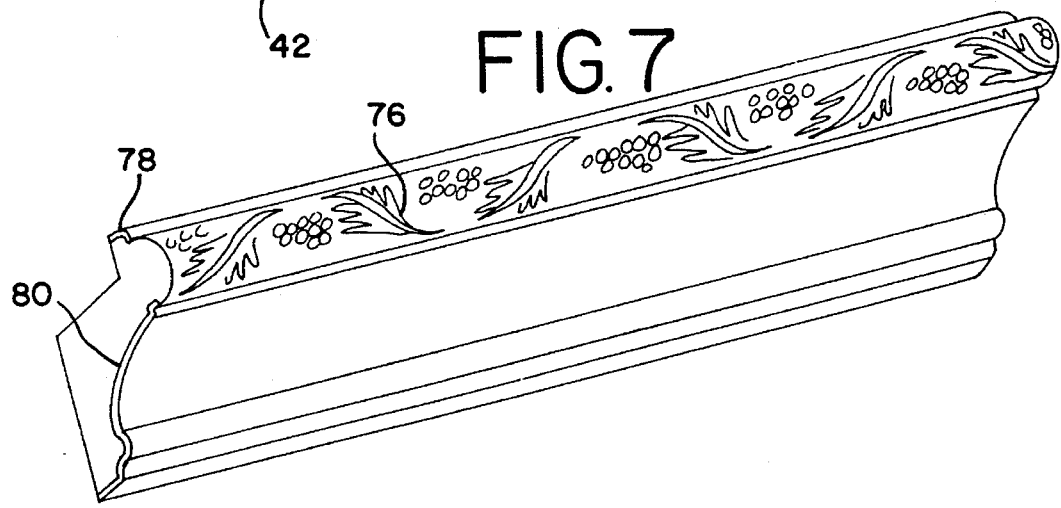
FIG. 7 is a perspective view of an extruded profile of the present invention.

One example of a completed profile is shown in FIG. 7. The decorative enhancement through embossing is shown along portion 76. The hardened skin portions 78, 80 are shown on the cross-section as they surround the decorative portion. The remaining portions of the profile may be given a hardened skin as desired.

An example of the use of the profile in a picture frame 82 is shown in FIG. 8. The profile forms the frame for the picture and the decorative enhancement provides an ornamentation for the frame. An example of the profile in a wall molding 84 is shown in FIG. 9. The decorative enhancement is provided in two separate locations 86, 88 along the wall molding. The hardened skin portions 90, 92, 94 are placed outside of the decorative portions.

While several embodiments of the invention are illustrated, it will be understood that the invention is not limited to these embodiments. Those skilled in the art to which the invention pertains may make modifications and other embodiments employing the principles of this invention, particularly upon considering the foregoing teachings.

Having described the preferred embodiments, the following examples are provided, but not intended to limit the scope of the invention in any way.

EXAMPLE 1

A profile extrusion material was formed from the following ingredients:

| Chemical Ingredient | Supplier & Trade Name | Parts |
| --- | --- | --- |
| Polyvinyl Chloride Resin | Georgia Gulf PVC 1082 | 100. |
| Tin Stabilizer | Witco Mark 1924 | 1.3 |
| Acrylic Process Aid | Kaneka K-12 | 5.18 |
| Calcium Carbonate | Supermite English China Clay | 12.95 |
| Calcium Stearate | Synpro Synproflo 92F | 0.78 |
| Parafin Wax | Witco Sunalite 160 | 0.39 |
| Oxidized Polyethylene | Allied Signal AC-629A | 0.07 |
| Azodicarbonamide | Uniroyal Celogen AZRV | 0.39 |
| TOTAL | | 121.06 |

EXAMPLE 2

A profile extrusion material was formed from the following ingredients:

| Chemical Ingredient | Supplier & Trade Name | Parts |
|---|---|---|
| Crystal Polystyrene | Arco Dylene 8 | 70 |
| High Impact Polystyrene | Chevron EA6765 | 30 |
| Mineral Oil | Penreco Drakeol Mineral Oil | 0.22 |
| Stearic Acid | Witco Hystrene 5D16 | 0.03 |
| Talc | R. T. Vanderbilt Nytal 400 | 1 |
| Baking Soda | Church & Dwight 3DF | 2.13 |
| Citric Acid | Miles Citric Acid | 0.16 |
| TOTAL | | 103.54 |

The above ingredients in each example were blended and utilized in an extrusion profile for a picture frame, as described above.

What is claimed is:

1. A method of forming a solid, elongated member of predetermined profile having a solid skin on a portion of the surface of said member and a decorative enhancement integrally formed on another portion of the surface of said member, comprising the steps of:

compressing an extrudable foam material at a compression stage by passage through an orifice, said orifice having at one end thereof a predetermined profile;

hardening a first portion of the surface of said foam material during said compression stage to provide a solid skin;

embossing a second portion of the surface of said profile following said compression stage by moving a heated embossing wheel over said second portion of the surface of said profile to provide a decorative enhancement, said decorative enhancement being integrally formed in said foam material;

solidifying said foam material to form a solid, elongated member.

2. The method of claim 1 wherein said hardening step is performed by cooling an internal solid surface of a portion of said orifice to a temperature below the softening point of the foam material.

3. The method of claim 1 wherein said embossing step is performed on a plurality of portions of the surface of said profile.

4. The method of claim 1 wherein said compression stage includes an extruder and a shaper.

5. The method of claim 1 wherein said compression stage includes an extruder and a vacuum tank.

6. The method of claim 1 wherein said embossing step in includes an embossing wheel and a support wheel.

7. The method of claim 6 wherein said embossing wheel provides a negative imprint along said foam material.

8. The method of claim 6 wherein said embossing wheel is pivotally moveable.

9. The method of claim 6 wherein said embossing wheel is located below said support wheel, said embossing wheel providing an imprint along said foam material.

10. The method of claim 1 wherein said solid, elongated member is stained and further provided with hot stamps.

11. The method of claim 1 wherein said foam material is polyvinyl chloride.

12. The method of claim 1 wherein said foam material is polystyrene.

13. A method of forming a solid, elongated member of predetermined profile having a solid skin on a portion of the surface of said member and a decorative enhancement integrally formed on another portion of the surface of said member, wherein an extrudable foam material is extruded from a die outlet into and through a shaper, the shaper having an internal solid surface defining a channel, including the steps of:

cooling a portion of the internal solid surface of the shaper to a temperature below the softening point of the extrudable foam material, extruding the foam material through the die outlet, immediately contacting the external surface of the foam material with the cooled portions of the internal solid surface of the shaper, thereby cooling rapidly a first portion of the external surface of the foam material to a temperature below the softening point of the foam material to form a skin of higher density material on a first portion of the external surface of the foam material, permitting the foam material to be extruded through the shaper and be drawn by a puller, imprinting a second non-hardened portion of the surface of said foam material by moving a heated embossing wheel over said second portion of the surface of said profile to provide a decorative enhancement, said decorative enhancement being integrally formed in said foam material;

solidifying said foam material to form a solid, elongated member.

14. The method of claim 13 wherein said shaper is a vacuum tank.

15. The method of claim 13 wherein said solid elongated member is stained and provided with hot stamps.

16. The method of claim 13 wherein said foam material is polyvinyl chloride.

17. The method of claim 13 wherein said foam material is polystyrene.

18. An extruded solid elongated member comprising:

an extruded body of foam plastic, a first portion of said extruded body having a hardened exterior skin, and a second portion of said extruded body having an ornamentation pattern integrally formed with said extruded body by moving a heated embossing wheel over said second portion of the surface of said profile.

19. The extruded member of claim 18 wherein said foam plastic comprises polyvinyl chloride resin.

20. The extruded member of claim 18 wherein said foam plastic comprises polystyrene.

21. The extruded member of claim 18 wherein said member is a frame for a picture, said ornamentation pattern providing a border for said picture frame.

22. The extruded member of claim 18 wherein said member is a wall molding, said molding having a plurality of ornamentation patterns, said plurality of ornamentation patterns extending across the length of said wall molding.

23. The extruded member of claim 18 wherein said member includes coatings and hot stamp pieces on the surface of said member.

* * * * *